United States Patent [19]

Seitz

[11] Patent Number: 5,002,924

[45] Date of Patent: Mar. 26, 1991

[54] CARBONLESS COPY PAPER COATING CONTAINING MICROENCAPSULATED LOAD BEARERS

[75] Inventor: Michael E. A. Seitz, Dayton, Ohio

[73] Assignee: The Standard Register Company, Dayton, Ohio

[21] Appl. No.: 417,461

[22] Filed: Oct. 5, 1989

[51] Int. Cl.[5] ........................ B41M 5/16; C09D 11/00

[52] U.S. Cl. ........................................ 503/207; 106/21; 106/31; 503/215

[58] Field of Search .................................... 106/21, 31; 427/150–152; 503/207, 215

[56] References Cited

U.S. PATENT DOCUMENTS

| | | | |
|---|---|---|---|
| 2,655,453 | 10/1953 | Sandberg | 117/36 |
| 3,996,061 | 12/1976 | Johnson | 106/22 |
| 4,211,437 | 7/1980 | Myers et al. | 428/216 |
| 4,280,718 | 7/1981 | Johnson et al. | 106/210 |
| 4,404,251 | 9/1983 | Jabs et al. | 428/320.6 |
| 4,411,451 | 10/1983 | Matsushita et al. | 428/320.6 |
| 4,416,966 | 11/1983 | Sanders et al. | 430/138 |
| 4,554,235 | 11/1985 | Adair et al. | 430/138 |

*Primary Examiner*—Bruce H. Hess

*Attorney, Agent, or Firm*—Killworth, Gottman, Hagan & Schaeff

[57] ABSTRACT

Microencapsulated load bearers to prevent the premature rupture of dye precursor-containing microcapsules are formed concurrently in the same microencapsulation process in which oil/dye precursor-containing microcapsules are formed by emulsifying an oily mixture, containing therein a dye-precursor solution and non-rupturable core particles, as droplets into an aqueous solution. The core particle and oil/dye precursor droplets are then microencapsulated to form a binary microcapsule mixture consisting of microencapsulated load bearers and oil/dye precursor-containing microcapsules, respectively. This binary microcapsule mixture in an appropriate solvent vehicle may be used as a coating for the preparation of carbonless copy paper.

14 Claims, No Drawings

CARBONLESS COPY PAPER COATING CONTAINING MICROENCAPSULATED LOAD BEARERS

BACKGROUND OF THE INVENTION

The present invention relates to carbonless copy paper and coatings therefore containing load bearers and to methods for producing such coatings. More particularly, it relates to a coating slurry containing microencapsulated load bearers having a non-rupturable core material, which are produced in situ so as to be interspersed among rupturable, dye precursor-containing microcapsules and designed in such a way that when the slurry is coated onto the surface of a sheet of carbonless copy paper, a uniform, even distribution of rupturable and non-rupturable microcapsules results which, in turn, promotes a clear, sharp image on the copy paper.

The use of load bearers interspersed with rupturable, dye precursor-containing microcapsules on the CB (coated back) side of carbonless copy paper, or in self-contained carbonless systems, to prevent premature rupture of the dye precursor-containing microcapsules is well known. This technique prevents unwanted smudging and discoloration of the paper due to low pressures applied thereto during storage, transportation, and routine handling. Many attempts have been made to develop a suitable load bearer capable of protecting the dye precursor-containing microcapsules from premature rupture under low pressures yet able to avoid interfering with the production of a clear, sharp image upon the application of direct pressure to the paper substrate, such as from a pen or typewriter key, by not prohibiting the dye-precursor from flowing from the intentionally crushed microcapsule on the CB sheet to the CF (coated front) sheet directly below. The CB sheet is superimposed on top of the CF sheet and the CF sheet is coated thereon with a layer of color-developer which reacts with the dye-precursor to form an image. To the extent that this reaction mechanism is interfered with, the image thus produced will be blurred or broken.

The current approach to the problem of premature rupture is to add inert particles to the microcapsule slurry prior to coating. These particles, which serve as load bearers, are much larger than the microcapsules to give protection thereto from low pressures. Starch balls and cellulose floc are the most common materials chosen. This approach is represented by U.S. Pat. Nos. 3,996,061; 4,280,718; and 4,404,251. Other materials have also been tried. For example, Sandberg in U.S. Pat. No. 2,655,453 teaches the use of glass beads, rounded white silica sand, casein particles, and vinyl acetate polymer as load bearing materials.

Myers et al in U.S. Pat. No. 4,211,437 discloses the use of large agglomerates of kaolin as stilt material. While he refers to his invention as a kaolincontaining "capsule", it is not, in fact, a capsule but rather is an agglomeration of kaolin particles bound together in a very large coacervated mass (see FIG. 2). These agglomerates of kaolin are 2 to 12 times larger than the microcapsules used therewith (col. 2, lines 50–57), have 1/5 to ⅓ the weight of the microcapsules (col. 4, lines 23–26), and are produced in an entirely separate process from that used to produce the microcapsules.

Matsushita et al in U.S. Pat. No. 4,411,451 discloses the use of a wax coating on the CB sheet to improve the transferability of dye-precursor from the CB sheet to the CF sheet (by preventing the dye-precursor from being absorbed onto the CB paper substrate). However, Matsushita does not teach the use of wax for load bearing purposes. Rather, Matsushita states that traditional materials such as starch balls are used for load bearing purposes (col. 3, lines 23–29).

These traditional approaches to the problem of premature rupture have major disadvantages. Differences in density, particle size, and colloid stability between the microcapsules and the load bearers result in their separation or classification during storage, application, and drying. The separation of the microcapsule/load bearer slurry results in uneven coating on the CB sheet. Such uneven coating in turn reduces the clarity or sharpness of the image produced and/or results in a broken image.

In the case of starch, whose density equals 1.4 and particle size is 18 microns, the ratios of its density and particle size to that of the typical microcapsule, whose density equals 0.98 and size is 3 to 6 microns, are 1.4 and 6 to 3, respectively. As a result, on storage the starch particles tend to settle while the capsules remain suspended or float. The slurry must be thoroughly mixed before use, and the stirring maintained throughout the coating operation to ensure a uniform mixture. The large size ratio between the particles also means a strong tendency towards separation during application and drying. This characteristic is generally recognized as the result of velocity differences (different mobilities) among the differently sized particles in the coating currents produced during application and drying. The large particles collect in regions of little flow, and the smaller particles in regions of high flow. A poor coating pattern can easily result. This pattern in turn can reduce the clarity or sharpness of the image produced by the CB.

This separation can be further exacerbated by a second type of separation induced by differences in the flocculation rates between the two types of particles present. Since the microcapsule and the starch ball have different surface characteristics in terms of their chemical nature and polarity, their colloidal stabilities in a given binder solution at a specific viscosity are not identical. A different colloidal stability means different flocculation rates resulting in the formation of larger flocculants of one particle compared to those of the second type of particle. This non-uniformity again produces a poor coating pattern. Void spaces due to starch flocculants can occur which in turn produce a broken image, and an overall deterioration in image quality similar to those mentioned previously.

Unrelated to the problem of premature rupture is U.S. Pat. No. 4,416,966 to Sanders et al. This patent discloses the use of photohardenable compositions contained within rupturable microcapsules. Upon exposure to radiation, those microcapsules thus exposed become hardened and non-rupturable. This feature is used to facilitate the imaging process whereby discrete portions of an imaging sheet containing photohardenable microcapsules are exposed to radiation. The entire sheet is then subjected to a uniform rupturing force so that only the unexposed microcapsules rupture and thereby produces a desired image. U.S. Pat. No. 4,554,235 to Adair et al relates to an improvement to the Sanders et al invention by further producing a high gloss image. Neither of these patents teaches the use of hard microcapsules as load bearers. Rather, the Sanders et al and Adair et al inventions teach the use of hardened microcapsules as part of the imaging process. By the time the Sanders et al and Adair et al microcapsules are hardened, they have already been coated onto the CB sheet and those sheets have already been handled, transported, stored, etc. If a load bearing function were to take place in the Sanders et al or Adair et al inventions, the hard microcapsules would have had to have been present much earlier.

The need thus remains for an improved load bearer having similar size, density, and surface characteristics as the rupturable microcapsules slurried therewith so that a uniform, evenly distributed CB coating can be achieved which in turn promotes a clear, sharp image.

SUMMARY OF THE INVENTION

That need is met by the present invention which provides a carbonless copy paper and coating therefore containing microencapsulated load bearers and also provides a unique in situ method for producing such coatings. The method of the present invention produces microencapsulated load bearers which are sufficiently similar to the rupturable, dye precursor-containing microcapsules randomly coated therewith on a CB sheet, so that a uniform, evenly distributed CB coating of rupturable and non-rupturable microcapsules is achieved.

The present invention eliminates the deficiencies of the prior art by using hardened, non-rupturable microcapsules as load bearers instead of using a foreign material for this purpose. Such load bearing microcapsules can be created by dispersing an oil-wettable core material of the appropriate particle size into an oily solution, i.e. an oil/dye-precursor mixture which in the preferred microencapsulation method has a reactant dissolved therein. This mixture is known as, and will become, the internal phase of the resultant microcapsules. The preferred core material to be used is wax. The internal phase is next emulsified as droplets into an aqueous solution, known as the external phase, which may include emulsifier(s) and protective colloid(s) and in the preferred method a coreactant for interfacial polymerization with the reactant. The emulsion thus formed contains two types of droplets. The first type of droplet consists of the oil/dye precursor mixture while the second type consists of a core particle surrounded by a film of the oil/dye precursor mixture. The size distribution of these droplets can be controlled to achieve a specified value by varying the flow rate of the internal phase through the emulsifier (dwell time), speed of the emulsifier (frequency), and the inlet/outlet pressures of the internal phase through the emulsifier.

Since the droplets containing the core material can only be reduced to a size approaching the primary particle size of the core particle, a binary distribution of droplets can be achieved containing oil/dye precursor at one size, and another size of droplets containing a core particle covered with a thin film of oil/dye precursor. Thus, by selecting appropriately sized core Particles and by varying the aforementioned parameters, the size difference between the two droplet types can be controlled so that the soon-to-be-formed load bearing microcapsules are only slightly larger than their accompanying oil/dye precursor-containing microcapsules. Preferably, the load bearing microcapsules are 1 to 2 times and most preferably about 1.5 times the size of the dye precursor-containing microcapsules. Preferably the microencapsulated load bearers have a diameter of between 3 and 12 microns while the core particle has a diameter of around 1–10 microns. By sizing the load bearing microcapsules to be only slightly larger than the dye precursor-containing microcapsules, the aforementioned problems associated with binary mixtures having large size differences between particles (separation during application and drying) are greatly minimized. This feature of the present invention thus represents an improvement over the prior art.

The microencapsulation process is performed on the droplets using any of the known methods of the prior art such as complex coacervation (illustrated by U.S. Pat. No. 2,800,456), interfacial polymerization (see, e.g., U.S. Pat. No. 3,432,327), or in situ polymerization (see, e.g., U.S. Pat. No. 4,089,882). Regardless of which method is employed, a microcapsule wall is formed at the oil/water interface of each droplet. A slurry of microcapsules are thus produced which can be classified into two types: a rupturable microcapsule containing therein a oil/dye precursor solution and a second larger, non-rupturable microcapsule containing therein a hardened core particle. These load bearing microcapsules are non-rupturable during storage, transportation, and handling of CB sheets coated thereon with the load bearing microcapsules due to the mechanical strength of the core material augmenting the strength of the wall.

As stated above, the preferred core material for the microencapsulated load bearers is wax. However, other oil-wettable materials such as polystyrene or silica may be used provided they can be readily dispersed into the internal phase without dissolving. Preferably, the core particle is selected such that its density matches or closely approximates that of the oil/dye precursor mixture. In the case of wax, for example, its density is approximately 0.94 and the density of a typical dye precursor solution is approximately 0.96. In this instance, the densities of the load bearing and dye precursor-containing microcapsules will be nearly equal. As hereinabove stated, one of the shortcomings associated with the load bearers found in the prior art is that the density differences between these load bearers and the microcapsules used therewith results in the stratification of the product during storage. Thus, the present invention provides another improvement over the prior art by providing load bearers with densities similar to those of the dye precursor-containing microcapsules slurried therewith so that a slurry consisting of the two particles will not stratify during storage.

The microencapsulated load bearers are made in situ with about 1 to 20% by weight of core material dispersed in the oily solution. That is to say, the microencapsulated load bearers and the dye precursor-containing microcapsules are concurrently encapsulated in the same process. Thus, the microcapsule wall material of both particles is identical. The surface characteristics of both types of microcapsules are therefore identical as well. Since the surface characteristics of the two microcapsules are the same, their colloidal stabilities and therefore rates of flocculation in solution will also be the same. Equal flocculation rates mean that the microencapsulated load bearers of the present invention and dye precursor-containing microcapsules will not group together in a slurry to form separate flocculants of like particles (which produces an uneven coating pattern and results in a broken image). Rather, the microencapsulated load bearers evenly distribute themselves in the solvent vehicle among dye precursor-containing microcapsules and thereby promote an evenly distributed CB coating. The result is a clean, unbroken image. This feature of the present invention represents yet another improvement over the prior art.

The present invention thus provides an improved load bearer capable of preventing the premature rupture of dye precursor-containing microcapsules while promoting, rather than interfering with, an evenly distributed CB coating of rupturable and non-rupturable microcapsules. Moreover, no particle separation or classification is likely to occur during storage, application onto a support sheet, or drying. The final result of the present invention, then, is a carbonless copy paper wherein production of a clear, sharp image free from smudging and discoloration is enhanced.

Accordingly, it is an object of the present invention to provide an improved carbonless copy paper sheet in the form of a support having thereon a coating containing microencapsulated load bearers, to provide a unique coating for producing such carbonless copy paper, and to provide a method for producing the coating.

These and other objects, features and attendant advantages of the present invention will become apparent to those skilled in the art from a reading of the following detailed description of the preferred embodiment and the appended claims.

DETAILED DESCRIPTION OF THE PREFERRED EMBODIMENT

To make microencapsulated load bearers of the present invention, appropriately sized core particles are dispersed into the oily solution of the internal phase prior to emulsification. The internal phase preferably consists of an oily solvent, a colorless, chromogenic dye precursor and a reactant such as a cross-linking agent, all as disclosed in copending application Ser. No. 141,633 filed Jan. 7, 1988, the disclosure of which is hereby incorporated by reference. A suitable concentration of the core particles in the internal phase is 1 to 20% by weight of the internal phase. An emulsifier is then used to disperse the internal phase into the external phase as droplets. The external phase is preferably an aqueous solution which may include protective colloid(s) and emulsifier(s) (if any), and a coreactant of the type also disclosed in application Ser. No. 141,633. While the interfacial polymerization encapsulation materials and material disclosed in Ser. No. 141,633 are preferred, other encapsulation systems such as complex coacervation and in situ polymerization may also be used.

As disclosed in Ser. No. 141,633, the microcapsules are formed using a polyelectrolyte complex or a polysalt consisting of 1) a high molecular weight polyanion, i.e., an alkali-soluble polymer with repeating units containing carboxylic, phosphoric, or sulfonic acid groups and/or amino acid groups, such as casein, sodium caseinate, zein, soya protein, polyacrylic acids, acrylic acid copolymers, maleic acid copolymers, and maleic anhydride copolymers and 2) a low molecular weight polycation having a molecular weight of less than 1200 such as a polyamine with a functionality of at least 3. The preferred polycation is a polycationic polyamine such as diethylene triamine and the preferred polyanion is casein.

An internal phase containing the dispersed core particles and an oily solution including a dye precursor and containing a crosslinking agent is dispersed into an aqueous solution of the polyanion. The crosslinking agent may be a polyisocyanate, a polyacid polychlorofoamate, or a polyaldehyde. The preferred crosslinking agent is a polyisocyanate. The polycation may be added before or after such dispersing steps. The crosslinking agent reacts with the polyamine-polyanion complex to form a strong, thick-walled capsule. Heat treatment accelerates the crosslinking. A denatured crosslinked layer of polyanion builds up around the droplet, thus producing a tough, thick capsule wall.

The key to the present invention is the dispersion of a hardenable core material in the internal phase. The preferred material to be used for core particles is wax. Examples of suitable waxes include micronized polyolefin waxes made from polyethylene or polytetraflouroethylene, microcrystalline wax, and Fischer-Tropsch waxes. Other oil-wettable materials such as polystyrene or silica may also be used provided they can be readily dispersed into the internal phase without dissolving.

Regardless of the type of material chosen for the core particles, the size of said core particles lies in the 1 to 10 micron range and is based on the desired size of the rupturable microcapsules used therewith. Specifically, the size of the core particles is slightly larger than the desired size of the oil/dye precursor droplets (whose size can be controlled by varying the emulsifier dwell time, frequency, and inlet/outlet pressures as hereinabove described) so that a load bearing microcapsule to rupturable microcapsule size ratio of 1-2 is achieved. The preferred load bearing microcapsule to rupturable microcapsule size ratio is 1.5.

As with size, the density of the core particles is also a function of the rupturable microcapsules used therewith. Core particles are selected such that the density thereof equals or approximately equals the density of the oil/dye precursor mixture. After microencapsulation of the core particle and dye precursor droplets, then, the densities of the two microcapsules will be equal or nearly equal.

The microencapsulated load bearers of the present invention and the dye precursor-containing microcapsules made therewith may be combined with an aqueous binder solution (i.e., the preferred solvent vehicle) and coated on a support to form a carbonless copy paper sheet which is preferably a CB sheet but may also be a self-contained or CFB sheet. When used as such, said load bearing microcapsules are evenly interspersed with said dye precursor-containing microcapsules on the carbonless copy paper sheet such that the dye precursor-containing microcapsules are protected by the load bearing microcapsules from premature rupture during routine storage, transportation, and handling of the carbonless copy paper sheets. In this manner, load bearing microcapsules thus prevent the carbonless copy papers from becoming smudged or discolored. The main advantage of the present invention over traditional load bearers is that a clear, sharp image, free from broken lines, is produced when the dye precursor-containing microcapsules are intentionally ruptured, as with a pen or typewriter key. The microencapsulated load bearers of the present invention facilitates such a clear image by promoting a uniformly distributed slurry of load bearing and dye precursor- containing microcapsules during the storage, CB coating, and drying thereof. Such a uniform distribution is made possible due to the similarity of the microencapsulated load bearers of the present invention and the dye precursor-containing microcapsules slurried therewith.

The following non-limiting example will more clearly define the invention.

EXAMPLE 1

A. Internal Phase. In a 2L beaker containing 682 g of disopropyl naphthalene, 66.0 g of Pergascript Green I-2GN, 35.6 g Pergascript Red I-6B, and 62.09 g Pergascript I-BR Black (all dye-precursors from Ciba-Geigy of Greensboro, North Carolina) were dissolved. The mixture was heated to 115° C. and 217g of Norpar 13 Special (an aliphatic solvent from Exxon of Baytown, Tex.) was added. The mixture was then cooled to room temperature. Dispersed into this solution was 44.1 g of MP 22 XF wax particles (primary particle size 3 m average and 8 m maximum from Micro Powders Corporation of Yonkers, New York). 72.0 g of Desmodur N-3200 (a biuret containing polyisocyante from Mobay Chemical Corporation of Pittsburgh, Pa.) was added and stirred until it dissolved.

B. External Phase. In a 4 L beaker containing 1064 g of water, 90 g of PVP-K30 (polyvinyl pyrrolidone with a molecular weight of 40,000), 555 g of methyl glucoside, and 13.5 g of borax was dissolved at room temperature. Into this clear solution, 90 g of casein was dispersed and heated to 65° C. After 30 minutes at 65° C., the casein dissolved and the solution was cooled to room temperature.

C. Encapsulation. The aqueous solution (B) was placed in a Waring blender connected to a Variac. With the blender set on low and the Variac at 60%, the oily solution (A) was poured into the vortex within a period of 30 seconds. After the addition was complete, the Variac was set to 90%, and the blender was allowed to run for an additional 30 seconds. The emulsion was then transferred to the 4 L beaker and stirred moderately to produce a slight vortex. Then, 14.9 diethylene triamine in 14.9 g of water was added to the emulsion. The mixture was heated to 60° C. and held at that temperature for 2 hours.

When coated at 0.5#/R (17×22), the CB coating produced an intense black image upon rupture of the microcapsules and remained free of discoloration with normal handling.

It will be obvious to those skilled in the art that various changes may be made without departing from the scope of the invention and the invention is not to be considered limited to what is described in the specification.

What is claimed is:

1. A coating for carbonless copy paper comprising a mixture of (a) pressure-rupturable, dye precursor-containing microcapsules, (b) microencapsulated load bearers having a non-rupturable core particle surrounded by a microencapsulated wall, and (c) a solvent vehicle.

2. The coating of claim 1 wherein said core particle is oil-wettable.

3. The coating of claim 2 wherein said core particle is wax.

4. The coating of claim 3 wherein said core particle is selected from the group consisting of micronized polyolefin waxes made from polyethylene or polytetrafluoroethylene, microcrystalline waxes, and Fischer-Tropsch waxes.

5. The coating of claim 1 wherein the diameter of said microencapsulated load bearers is 1 to 2 times larger than the diameter of said dye precursor-containing microcapsules.

6. The coating of claim 5 wherein the diameter of said microencapsulated load bearers is 3 to 12 microns and the diameter of said core particle is 1 to 10 microns.

7. The coating of claim 1 wherein the density of said microencapsulated load bearers is approximately equal to that of said dye precursor-containing microcapsules.

8. The coating of claim 1 wherein the microcapsule wall material of said microencapsulated load bearers is identical to that of said dye precursor-containing microcapsules.

9. The coating of claim 1 wherein said solvent vehicle is an aqueous binder system.

10. A carbonless copy paper sheet comprising a support and a layer of coating on said support, said coating comprising a mixture of pressure-rupturable dye precursor-containing microencapsules and microencapsulated load bearers having a non-rupturable core particle surrounded by a microencapsulated wall.

11. The carbonless copy paper sheet of claim 11 wherein said core particle is wax.

12. The carbonless copy paper sheet of claim 11 wherein said core particle is selected from the group consisting of micronized polyolefin waxes made from polyethylene or polytetrafluoroethylene, microcrystalline waxes, and Fischer-Tropsch waxes.

13. The carbonless copy paper sheet of claim 12 wherein the diameter of said microencapsulated load bearers is 1 to 2 times larger than the diameter of said dye precursor-containing microcapsules.

14. The carbonless copy paper sheet of claim 13 wherein the diameter of said microencapsulated load bearers is 3 to 12 microns and the diameter of said core particle is 1 to 10 microns.

* * * * *